United States Patent
Friend et al.

(10) Patent No.: US 6,248,478 B1
(45) Date of Patent: Jun. 19, 2001

(54) BATTERY

(75) Inventors: Stephen O. Friend, Boxford; Jaspard Harvey Atkins, Westwood, both of MA (US); Howard G. Tennent, Kennett Square, PA (US); Robert Hausslein, Lexington, MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 08/456,226

(22) Filed: May 31, 1995

Related U.S. Application Data

(63) Continuation of application No. 08/284,738, filed on Aug. 2, 1994, now abandoned, which is a continuation of application No. 07/692,819, filed on Apr. 25, 1991, now abandoned, which is a continuation of application No. 07/413,844, filed on Sep. 28, 1989, now abandoned.

(51) Int. Cl.$^7$ .............................. H01M 4/58; H01M 4/48
(52) U.S. Cl. ...................... 429/231.8; 429/206; 429/220; 429/221; 429/224; 429/229
(58) Field of Search ..................................... 429/206, 209, 429/212, 217, 232, 104, 224, 229, 231.8, 220, 221

(56) References Cited

U.S. PATENT DOCUMENTS

| | | |
|---|---|---|
| 3,964,933 | 6/1976 | Fung et al. . |
| 4,076,902 * | 2/1978 | Senoo ................................... 429/104 |
| 4,136,213 | 1/1979 | Fung et al. . |
| 4,263,383 * | 4/1981 | Coulombeau et al. .......... 429/232 X |
| 4,323,470 * | 4/1982 | Mahato et al. .................... 429/225 X |
| 4,415,637 * | 11/1983 | Robinson et al. .................... 429/218 |
| 4,560,443 | 12/1985 | Folier . |
| 4,608,379 * | 8/1986 | Schumm, Jr. ...................... 429/232 X |
| 4,663,230 | 5/1987 | Tennent ................................ 428/367 |
| 4,759,989 | 7/1988 | Abe et al. ............................. 428/408 |
| 4,816,289 | 3/1989 | Komatsu et al. . |
| 4,861,690 * | 8/1989 | Hope et al. ........................ 429/232 X |
| 5,110,693 * | 5/1992 | Friend et al. . |

FOREIGN PATENT DOCUMENTS

| | | |
|---|---|---|
| 0198558 | 4/1986 | (EP) . |
| 62-276080 | 11/1987 | (JP) . |
| 62-276082 | 11/1987 | (JP) . |
| 8707559 | 12/1987 | (WO) . |

OTHER PUBLICATIONS

Baker, Carbon 27:315–23 (No Month ) (1989).
JP61119716, Abstract, "Gas–phase carbon fibre suitable as catalyst base or as electrode for fuel cell" (Jun. 6, 1986).
Kinoshita, Carbon, "Electrochemical and Physicochemical Properties", Chpt. 7, "Application of carbon in electrochemical systems", pp. 397–411, (1988, Wiley–Interscience publication) (No month).
Linden, *Handbook of Batteries and Fuel Cells*, pp. 1–3–1–12, 5–5 (McGraw–Hill (1984) (No month) .
Endo, Chemtech, "Grow carbon fibers in the vapor phase", pp. 568–576, (Sep./1988).
Endo et al., (abstract), "Li secondary battery using highly ordered graphite fiber electrode", MRS meeting, pp. 157–160 (No Month)–1988).
Tibbetts et al., SAMPE Journal, "Carbon fibers grown from the vapor phase: a novel material", pp. 30–35 (Sep./Oct. –1986).
JP 63-282313, Nakatani et al, 1988 (month not available).

* cited by examiner

*Primary Examiner*—John S. Maples
(74) *Attorney, Agent, or Firm*—Kramer Levin Naftalis & Frankel LLP

(57) ABSTRACT

An improved battery having an anode, a cathode that includes a chemically reducible material into which is incorporated an amount of electrically conductive carbon microfibers sufficient to enhance the electrical conductivity of said chemically reducible material, and an electrolyte.

29 Claims, 1 Drawing Sheet

BATTERY

Figure 1:
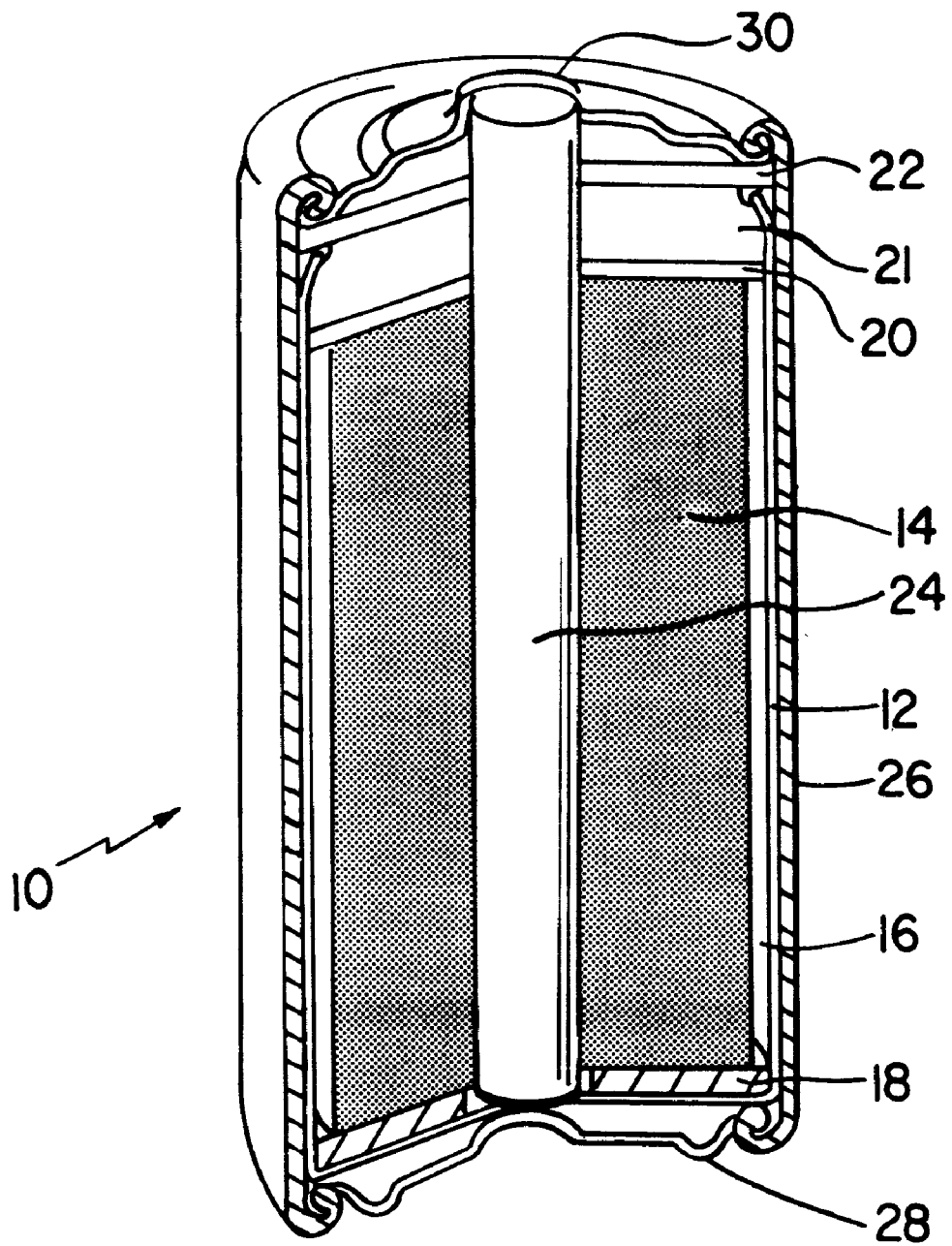

This application is a continuation of application Ser. No. 08/284,738, filed Aug. 2, 1994, now abandoned, which is a continuation of Ser. No. 07/692,819, filed on Apr. 25, 1991, now abandoned, which is a continuation of Ser. No. 07/413,844, filed on Sep. 28, 1989, now abandoned.

BACKGROUND OF THE INVENTION

This invention relates to electrochemical cells.

Batteries are a type of electrochemical cell containing an anode, a cathode, and an electrolyte in which the anode and cathode are permanently contained within the cell. Batteries containing a metal anode, metal oxide cathode, and an electrolyte are known. Because metal oxides generally are poor electrical conductors (their conductivities are in the semiconducting to insulating range), an electrically conductive material is added to the metal oxide to render the cathode electrically conductive.

Carbon microfibers (i.e. fibers having diameters less than 1 micron) are also known. Microfibers having diameters less than 0.5 micron are referred to as fibrils.

SUMMARY OF THE INVENTION

In general, the invention features an improved battery having an anode, a cathode that includes a chemically reducible material into which is incorporated an amount of electrically conductive carbon microfibers sufficient to enhance the electrical conductivity of the chemically reducible material, and an electrolyte.

In preferred embodiments, the microfibers have diameters no greater than 0.1 micron and length to diameter ratios of at least 5. Even more preferred are carbon microfibers that are tubes having graphitic layers that are substantially parallel to the microfiber axis and diameters between 3.5 and 75 nanometers, inclusive, as described in Tennent, U.S. Pat. No. 4,663,230 ("Carbon Fibrils, Method for Producing Same and Compositions Containing Same"), Tennent et al., U.S. Ser. No. 871,676 filed Jun. 6, 1986 ("Novel Carbon Fibrils, Method for Producing Same and Compositions Containing Same"), Tennent et al., U.S. Ser. No. 871,675 filed Jun. 6, 1986 ("Novel Carbon Fibrils, Method for Producing Same and Encapsulated Catalyst"), Snyder et al., U.S. Ser. No. 149,573 filed Jan. 28, 1988 ("Carbon Fibrils"), Mandeville et al., U.S. Ser. No. 285,817 filed Dec. 16, 1988 ("Fibrils"), and McCarthy et al., U.S. Ser. No. 351,967 filed May 15, 1989 ("Surface Treatment of Carbon Microfibers"), all of which are assigned to the same assignee as the present application and are hereby incorporated by reference. One aspect of substantial parallelism is that the projection of the graphite layers on the microfiber axis extends for a relatively long distance in terms of the external diameter of the microfiber (e.g., at least two microfiber diameters, preferably at least five diameters), as described in Snyder et al., U.S. Ser. No. 149,573. These microfibers preferably are also substantially free of a continuous thermal carbon overcoat (i.e. pyrolytically deposited carbon resulting from thermal cracking of the gas feed used to prepare the microfibers). These microfibers also are preferably in the form of aggregates in which individual microfibers are randomly entangled with each other or oriented substantially parallel to each other.

Preferred batteries include both primary (i.e. non-rechargeable) batteries and secondary (i.e. rechargeable) batteries. Examples of preferred batteries include reserve batteries, alkaline batteries (e.g., alkaline zinc-manganese dioxide batteries), and Leclanche batteries. The chemically reducible material for the cathode preferably includes a metal oxide (e.g., $MnO_2$, HgO, $Ag_2O$, AgO, $PbO_2$, or NiOOH), a metal chloride (e.g., CuCl), a metal sulfide (e.g., FeS), or sulfur. The anode preferably includes Zn, Li, Cd, Ag, Mg, Fe, Na, Li—Al alloy, or Pb metal.

In the case of a Leclanche or alkaline zinc-manganese dioxide battery, the amount of microfibers incorporated into the cathode preferably is less than 0.5 grams per gram of chemically reducible material, more preferably less than 0.2 grams.

The invention also features a method for preparing the battery. Preferably, the microfibers are milled or co-milled with the chemically reducible material. Preferred milling methods include mechanical and chemical milling (by exposure to a chemical reagent that decreases the microfiber length, e.g., by chopping the microfiber). A preferred method for preparing the battery involves growing the chemically reducible material in situ within the electrically conductive network formed by the carbon microfibers.

The invention provides a battery having high energy density. The battery exhibits a long discharge lifetime and high utilization of the chemically reducible material. The microfibers enable the cathode to retain an effective amount of electrolyte for efficient operation. This ability is maintained even after vigorously mixing the microfibers and chemically reducible material to form the cathode. Moreover, high amounts of the chemically reducible material can be incorporated in the cathode.

Other features and advantages of the invention will be apparent from the following description of the preferred embodiments thereof, and from the claims.

Description of the Preferred Embodiments

We first briefly describe the FIGURE.

The FIGURE is a cross-sectional view, partially broken away, of a battery embodying the invention.

Carbon microfibers are suitable in the cathodes of a wide variety of battery systems. Typically, these batteries feature an electrically conductive metal that acts as an anode and a chemically reducible material as the cathode. The particular cathode material is chosen based upon the anode material, as one of ordinary skill in the art will readily appreciate. Examples of suitable anode-cathode combinations (taken from *Handbook of Batteries and Fuel Cells*, ed. David Linden, ch. 1, p. 10, McGraw-Hill (1984)) are shown below in Table I:

TABLE I

| Battery System | Anode | Cathode |
|---|---|---|
| A. Primary Batteries | | |
| Leclanche | Zn | $MnO_2$ |
| Magnesium | Mg | $MnO_2$ |
| Alkaline $MnO_2$ | Zn | $MnO_2$ |
| Mercury | Zn | HgO |
| Mercad | Cd | HgO |
| Silver Oxide | Zn | $Ag_2O$ |
| Li/$MnO_2$ | Li | $MnO_2$ |
| B. Reserve Batteries | | |
| Cuprous chloride | Mg | CuCl |
| Zinc/silver oxide | Zn | AgO |
| C. Secondary Batteries | | |
| Lead-acid | Pb | $PbO_2$ |

TABLE I-continued

| Battery System | Anode | Cathode |
| --- | --- | --- |
| Edison | Fe | NiOOH |
| Nickel-cadmium | Cd | NiOOH |
| Silver-zinc | Zn | AgO |
| Nickel-zinc | Zn | NiOOH |
| Silver-cadmium | Cd | AgO |
| High temperature | Li(Al) | FeS |
| High temperature | Na | S |

The carbon microfibers increase the electrical conductivity of the cathode by forming an effective electrically conductive network throughout the chemically reducible material and physically bind or absorb liquid electrolyte dispersed throughout the cathode; the latter feature is particularly useful in Leclanche cells. Preferred microfibers are carbon fibrils having small diameters (preferably between about 3.5 and 75 nanometers), length to diameter ratios of at least 5, and graphitic layers that are substantially parallel to the fibril axis that are also substantially free of a continuous thermal carbon overcoat, as described in Tennent, U.S. Pat. No. 4,663,230; Tennent et al., U.S. Ser. No. 871,676; Tennent et al., U.S. Ser. No. 871,675; Snyder et al., U.S. Ser. No. 149,573; and Mandeville et al., U.S. Ser. No. 285,817. The fibrils may also be treated to introduce oxygen-containing functional groups onto the fibril surface, as described in McCarthy et al., U.S. Ser. No. 351,967.

When produced in useful quantities, the fibrils are in the form of aggregates of individual fibrils. For example, the process described in Snyder et al., U.S. Ser. No. 149,573 yields aggregates of randomly entangled fibrils resembling bird nests. A second type of aggregate consists of clusters of individual fibrils in which the fibrils are oriented substantially parallel to each other, giving the aggregate the appearance of combed yarn. The lengths and diameters of fibrils in each cluster are essentially uniform, although they may vary from cluster to cluster. These aggregates, and a method for making them, are described in Moy, U.S. Ser. No. 284,917, now issued as U.S. Pat. No. 5,356,897 entitled "Fibril Aggregates and Method for Making Same" filed concurrently with the present application and assigned to the same assignee as the present application which is hereby incorporated by reference in its entirety.

The substantially parallel graphitic layers of the individual fibrils are desirable because they enhance electrical conductivity. The small diameters enhance electrolyte absorption. The lack of a continuous thermal carbon overcoat leads to enhanced electrical conductivity and oxidation resistance. The particular balance of properties chosen depends on the application for which the battery is intended. For example, in the case of alkaline batteries, it is desirable to minimize the tendency of the cathode mixture to "spring back" when incorporated into the battery, thereby maximizing the amount of chemically reducible material that can be incorporated into the battery. Spring back is decreased by milling the fibrils to decrease the size of the fibril aggregates and the lengths of individual fibrils, e.g., by mechanical milling using a ball or stirred ball mill or by chemical milling using chemical reagents such as those described in McCarthy et al., U.S. Ser. No. 351,967. Although milling reduces electrolyte absorption, the reduction is compensated by the decrease in spring back. The milling time is selected to achieve an optimal balance between electrolyte absorption and spring back. On the other hand, for batteries such as Leclanche cells, high electrolyte absorption is more critical than spring back. Thus, for these batteries fibrils with higher length to diameter ratios than in the case of alkaline batteries are desirable.

The FIGURE depicts a Leclanche battery 10 having a zinc anode 12 and a cathode 14 that is a compressed mixture of a minor portion of carbon fibrils and a major portion of manganese dioxide. An aqueous electrolyte is dispersed throughout cathode 14. Zinc anode 12 is shaped to form an enclosure (e.g., a can) for housing cathode 14.

Battery 10 also features a separator 16 interposed between anode 12 and cathode 14 to prevent electrical contact between the two from being established. A sealing washer 18 placed at the bottom of battery 10 also helps keep anode 12 and cathode 14 from contacting each other. A compression washer 22 and a vent washer 20 placed on top of cathode 14 help seal the contents of battery 10. An air space 21 between the two washers is left. A carbon rod 24 inserted through the two washers so that it contacts cathode 14 forms a current collector for collecting current from cathode 14 when battery 10 is in use.

A jacket 26 surrounds the battery components and provides environmental protection, A metal bottom 28 and a metal top 30 provide electrical connections to an external circuit (not shown).

A Leclanche battery having a zinc anode, zinc chloride electrolyte, and a cathode made of manganese dioxide admixed with carbon fibrils (prepared according to the methods in the above-described patent and patent applications) was prepared as follows.

To prepare the cathode mixture, the fibrils, manganese dioxide, and mercuric chloride corrosion inhibitor were added to the bowl of a Kitchen Aid Doughmixer (model KSM90 with flat beater) and dry-mixed for 2 minutes at the slowest speed. The zinc chloride electrolyte was then added to the mixture from a sprinkler bottle over a period of 30–45 seconds with stirring. Following the electrolyte addition, the Doughmixer speed was increased to the number 3 setting. Mixing continued at this speed for 2½ minutes, after which the mixture was transferred to a glass bowl and then stored overnight inside a sealed plastic bag.

To assemble the battery, a paper liner was inserted into a zinc can (the anode). A sealing washer was then placed in the bottom of the lined can. After taring the lined can, the desired amount of the cathode mixture was added; during addition, the mixture was manually compressed using, as a compression tool, a 1 inch diameter by 3½ inch long solid cylinder. The proper amount of cathode mixture was the amount necessary to fill the can to within a half inch of the top with 100–200 psi pressure.

Following addition of the cathode mixture, a compression washer was placed on the face of a compression tool sized to fit into the can for a depth of 0.5 inch; the face of the tool was machined to form a dimple for holding and centering the compression washer. The tool was then inserted into the zinc can and the compression washer driven into the can under an applied pressure of 100–200 psi.

Next, the compression tool was replaced with a centering tool seated in a 2 ton hydraulic press with a handle modified to accept a torque wrench for inserting a carbon rod into the battery. The centering tool was a one inch long cylinder having an outside diameter designed to fit into the zinc can and an inside diameter designed to hold the carbon rod and keep it centered while it is forced down into the cathode mixture. The carbon rod was placed in the center of the tool and driven down into the battery to the top of the tool. The tool was then removed and the carbon rod driven down to where it touched bottom in the hydraulic press.

Following insertion of the carbon rod, a paper seal (vent washer) was mounted on the centering tool and driven down into the battery to about ⅛ inch from the top of the can. This left an empty expansion volume in the battery between the compression washer and the paper seal. A small metal cap was then placed over the exposed end of the carbon rod using the hydraulic press to seat it. Finally, hot sealing wax was poured around the carbon rod on top of the paper seal to form a water-tight seal between the rod and the walls of the zinc can.

Table II contains three battery compositions prepared as described above. Each features a zinc anode, an aqueous zinc chloride electrolyte, and a manganese dioxide-carbon fibril cathode. The grams of cathode mix per battery refers to the amount of each cathode mix (fibrils, manganese dioxide, and corrosion inhibitor moistened with electrolyte) that will fill 27 cm$^3$ (the volume of a D-cell can filled to within a half inch of the top) when compressed with a force of 150 psi. The lifetime to 0.65 volts and the utilization capacity (i.e. the area under the current-time curve where time beyond 0.65 volts is not counted) was measured by connecting the battery to a 6 station D-cell battery holder with a 2.2 ohm 3 watt wirewound resistor load across each station. The percent utilization of manganese dioxide was determined by comparing the actual utilized capacity (in ampere-hours) with the theoretical utilization capacity. The latter was determined based upon the number of moles of manganese in the cathode mix. For each mole of manganese that is reduced from $Mn^{+4}$ to $Mn^{+3}$, 96,500 coulombs (corresponding to 26.7 ampere-hours) are theoretically utilized.

TABLE II

| Sample No. | 1 | 2 | 3 |
|---|---|---|---|
| Grams of cathode mix per battery | 56 | 56 | 58 |
| Grams of fibrils per battery | 2.88 | 2.33 | 2.33 |
| Grams of $MnO_2$ per battery | 29.41 | 29.72 | 29.72 |
| Grams of $ZnCl_2$ per battery | 5.91 | 5.97 | 6.47 |
| Grams of $H_2O$ per battery | 17.73 | 17.92 | 19.42 |
| Lifetime to 0.65 v (min.) | 523 | 579 | 605 |
| Utilized capacity (amp-hours) | 4.03 | 4.26 | 4.61 |
| % utilization of $MnO_2$ | 44.7 | 46.7 | 50.6 |

Other embodiments are within the following claims.

For example, the cathode can be prepared by co-milling the chemically reducible material with the microfibers. It can also be prepared by growing the chemically reducible material in situ within the conductive network formed by the carbon microfibers.

What is claimed is:

1. In a battery comprising an anode, a cathode that includes a chemically reducible material into which is intimately mixed an amount of an electrically conductive material sufficient to enhance the electrical conductivity of said chemically reducible material, and an electrolyte, the improvement wherein said electrically conductive material comprises carbon microfibers in the form of aggregates, each microfiber having a diameter between 3.5 to 75 nanometers, the amount of microfibers incorporated into said cathode being less than or equal to 0.5 grams per gram of said chemically reducible material.

2. The battery of claim 1 wherein the diameter of said microfibers is no greater than 0.075 micron.

3. The battery of claim 1 wherein the length to diameter ratio of said microfibers is at least 5.

4. The battery of claim 1, wherein said microfibers are free of a continuous thermal carbon overcoat.

5. The battery of claim 1 wherein said microfibers are in the form of aggregates in which individual microfibers are randomly entangled with each other.

6. The battery of claim 1 wherein said microfibers are in the form of aggregates in which individual microfibers are oriented substantially parallel to each other.

7. The battery of claim 1 wherein said battery is a primary battery.

8. The battery of claim 7 wherein said primary battery is a Leclanche battery.

9. The battery of claim 8 wherein the amount of microfibers incorporated into said cathode is less than or equal to 0.2 grams per gram of said chemically reducible material.

10. The battery of claim 1 wherein said battery is a secondary battery.

11. The battery of claim 1 wherein said battery is a reserve battery.

12. The battery of claim 1 wherein said battery is an alkaline battery.

13. The battery of claim 12 wherein said alkaline battery is an alkaline zinc-manganese dioxide battery.

14. The battery of claim 13 wherein the amount of microfibers incorporated into said cathode is less than 0.5 grams per gram of said chemically reducible material.

15. The battery of claim 14 wherein the amount of microfibers incorporated into said cathode is less than 0.2 grams per gram of said chemically reducible material.

16. The battery of claim 1 wherein said chemically reducible material comprises a metal oxide.

17. The battery of claim 16 wherein said metal oxide is selected from the group consisting of $MnO_2$, Hgo, $Ag_2O$, AgO, $PbO_2$, and NiOOH.

18. The battery of claim 1 wherein said chemically reducible material comprises a metal chloride.

19. The battery of claim 18 wherein said metal chloride is CuCl.

20. The battery of claim 1 wherein said chemically reducible material comprises sulfur or a metal sulfide.

21. The battery of claim 20 wherein said metal sulfide is FeS.

22. The battery of claim 1 wherein said anode is selected from the group consisting of zinc, lithium, cadmium, silver, magnesium, iron, sodium, lithium-aluminum alloy, and lead metal.

23. The battery of claim 1, wherein each of said carbon microfibers comprise multiple graphitic layers.

24. In a Leclanche battery comprising a zinc anode, a manganese dioxide cathode into which is intimately mixed an amount of an electrically conductive material sufficient to enhance the electrical conductivity of said manganese dioxide and an electrolyte, the improvement wherein said electrically conductive material includes carbon microfibers having graphitic layers and diameters between 3.5 and 75 nanometers.

25. The Leclanche battery of claim 24, wherein each of said carbon microfibers comprise multiple graphitic layers.

26. In an alkaline zinc-manganese dioxide battery comprising a zinc anode, a manganese dioxide cathode into which is intimately mixed an amount of an electrically conductive material sufficient to enhance the electrical conductivity of said manganese dioxide and an alkaline electrolyte, the improvement wherein said electrically conductive material includes carbon microfibers having graphitic layers and diameters between 3.5 and 75 nanometers.

27. The battery of claim 26, wherein each of said carbon microfibers comprise multiple graphitic layers.

28. In a battery comprising an anode, a cathode that includes a chemically reducible material into which is intimately mixed an amount of an electrically conductive material sufficient to enhance the electrical conductivity of said chemically reducible material, and an electrolyte, the improvement wherein said electrically conductive material comprises carbon microfibers in the form of aggregates in which microfibers are oriented substantially parallel to each other, each microfiber having a diameter between 3.5 to 75 nanometers, the amount of carbon microfibers incorporated into said cathode being less than or equal to 0.5 grams per gram of said chemically reducible material.

29. In a battery comprising an anode, a cathode, a current collector, and an electrolyte, wherein said cathode includes a chemically reducible material into which is intimately mixed an amount of an electrically conductive material sufficient to enhance the electrical conductivity of said chemically reducible material, wherein only said electrically conductive material comprises carbon microfibers, each microfiber having a diameter between 3.5 to 75 nanometers, the amount of microfibers incorporated into said cathode being from about 0.08 to less than or equal to 0.5 grams per gram of said chemically reducible material.

* * * * *